United States Patent Office 3,262,152
Patented July 26, 1966

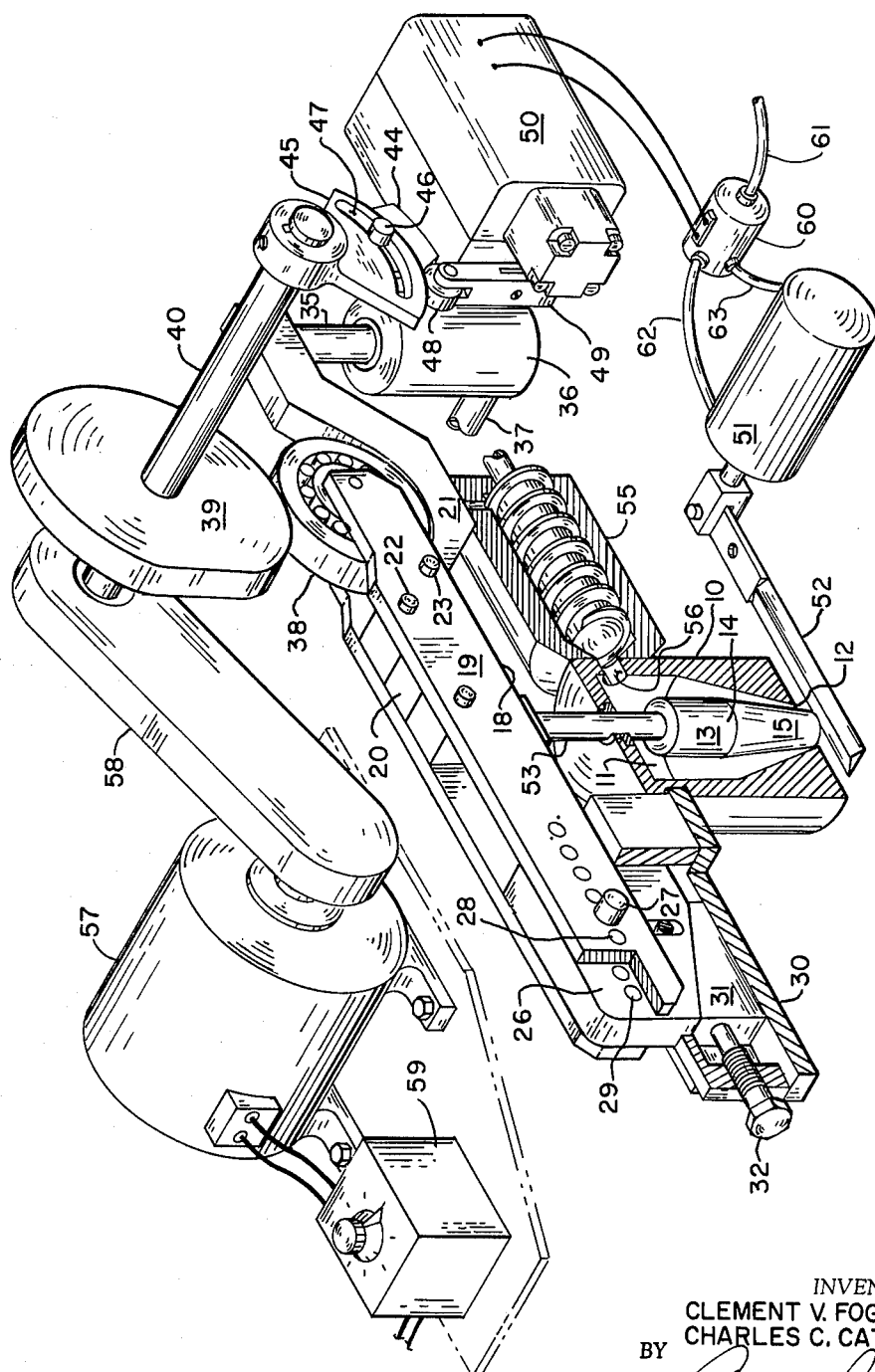

3,262,152
APPARATUS FOR FORMING PARISONS
Clement V. Fogelberg and Charles C. Catlin, Boulder, Colo., assignors to Ball Brothers Company Incorporated, Muncie, Ind., a corporation of Indiana
Filed Mar. 25, 1963, Ser. No. 268,518
7 Claims. (Cl. 18—5)

This invention relates to a new and improved method and apparatus for forming hollow plastic articles and more particularly relates to an improved method and apparatus for forming successive lengths of plastic tubing or parisons to be blow molded into hollow plastic articles, such as bottles or containers.

In forming hollow plastic articles having wide variations in size, shape or strength requirements along their longitudinal length, it is necessary to change the amount of material distributed to different portions of the plastic tubing which will be expanded into the plastic article. Heretofore, the wall thickness of extruded tubing has been controlled by reciprocating a mandrel within a die toward and away from the orifice of the die while extruding material around the mandrel and through an annular orifice formed thereby. This reciprocating movement generally has been produced by using a biasing mechanism such as a spring to pull the mandrel in one direction, and a wall thickness controlling mechanism to force the mandrel in the opposite direction.

In these instances, the thickness controlling mechanism has been applied to the mandrel directly or through a complex sleeve arrangement, such as a cam acting upon or pressing against the mandrel. The employment of such mechanisms was not completely satisfactory since it did not permit the high degree of adjustment necessary when forming articles such as bottles or containers having a body portion of very much larger diameter than that of the neck portion, requiring the wall thickness of the tubing to be changed very suddenly.

Another problem encountered with previous methods was that they utilized devices for reciprocating the mandrel which tended to wear very quickly, such as a tapered or contoured key passing through a slot in a mandrel and pressing against the mandrel, or a cam operating in frictional contact with a surface on the end of the mandrel. The wear of the key and the cam and the surfaces on which they acted caused inaccuracies in the supply of material apportioned to various parts of the tubing.

A further problem with past methods and apparatus for controlling wall thickness of extruded tubing was that they were not usable in applications where the tubing was extruded at a very high rate and where the final articles were required to be within a minimum weight tolerance. One reason for this difficulty was the fact that close tolerance was necessary between the points of the tubing where the wall thickness changed and the points on the surface of the mold which were to be adjacent to the changing points. This required very close timing between the extrusion operation and the cutting operation which could not be achieved with prior apparatus. Making the problem more difficult was the fact that the mechanical and electrical devices employed had inherent inaccuracies in their operation such as the drift of an electric motor, regardless of the quality of their constant speed characteristics.

In view of the above described deficiencies and shortcomings of the methods and apparatus heretofore employed, it was totally unexpected and completely surprising to discover that by employing the method and apparatus of the invention the wall thickness of an extruded tubing can be controlled more accurately than has been possible in the past. Moreover, the wall thickness of the cut lengths of tubular material is controlled while avoiding the problem of inaccuracy due to drift in the electrical and mechanical elements. A further advantage of the method and apparatus of the invention is that each successive length of plastic tubing is formed in substantially the same contour each time, regardless of the extrusion speed or the length of the tubing selected. An additional advantage of the method and apparatus of the invention is that much material is saved by distributing larger quantities of material only to portions of the article requiring greater strength or wall thickness, while limiting the distribution of material to the remaining portions requiring less strength or wall thickness.

Other advantages and benefits of the method and apparatus of the present invention will be apparent from the following description and drawing which is a perspective view partially in section of an apparatus of the invention.

In the drawing, extrusion die 10 has chamber 11 therein, the lower portion of which tapers downwardly to an outlet orifice 12 of smaller diameter. An extruder 55 is arranged to extrude plastic material at a constant speed and feed it under pressure through passage 56 into chamber 11 of die 10. A valve member 13 having an upper cylindrical body portion 14 and a lower tapered portion 15 is disposed within chamber 11. The lower end of tapered portion 15 cooperates with outlet orifice 12 of the die to form an annular orifice for the extrusion of hollow tubing. A knife 52 connected to an air cylinder 51 is positioned below die 10 to cut the extruded tubing into desired lengths.

A rod 53 extends upwardly from valve member 13 and is pivotably attached to arm 18. The arm 18 is made up of longitudinal members 19 and 20 interleaved over one end of member 21 and firmly connected to it by pins 22 and 23. Arm 18 is pivotably attached at its opposite end to a block 26 by a pin 27 passing through one set of a plurality of matching holes 28 and 29 in the members 19 and 20 and the block 26, respectively. The position of the block can be adjusted and altered by the use of tapered shim 31 acting between frame 30 and the bottom of the block as controlled and adjusted by bolt 32. Acting upon the member 21 and exerting a constant force upon it is a biasing means shown in the drawing as a piston 35 movable within cylinder 36 which is connected to a source of fluid pressure (not shown) through line 37. Rotatably mounted near one end of arm 18 is a follower wheel 38 which contacts a suitably shaped cam 39 secured to a rotatable shaft 40 driven by a variable speed motor 57 through speed reducer 58. The speed of motor 57 is controlled by speed control unit 59. A second cam 45 which is also secured to shaft 40 has a switch actuating portion 44 adjustably attached thereto by means of a bolt 46 carried in a radial slot 47 of cam 45. A wheel 48, rotatably fixed to an arm 49 of a micro-switch 50, is positioned in contact with cam 45 and actuator 44. The micro-switch 50 is electrically connected to a D.C. rotary solenoid valve 60 which controls the flow of fluid pressure through pressure tube 61 to air cylinder 51 through either pressure line 62 or pressure line 63. This moves the knife 52 attached thereto horizontally across and below the outlet orifice of the die 10.

In the operation of the apparatus of the invention shown in the drawing, cam 39, driven by a variable speed motor (not shown), contacts a follower wheel 38 rotatably mounted on arm 18. The follower wheel 38 is maintained against the cam 39 by means of the constant pressure exerted upon the member 21 by piston 35 and cylinder 36. Rod 53 which extends upwardly from valve member 13 is pivotably attached to arm 18 so that when the rotation of cam 39 reciprocates the arm 18 through a short arc path about its pivot 27, the rod 53 moves the valve member 13 within the die 10. Reciprocation of valve member 13 changes the wall thickness of the tubing as it is being extruded. As cam 39 is being rotated on shaft 40, cam 45 and switch actuator 44 are also being rotated. Once in each revolution of shaft 40, actuator 44 contacts wheel 48 moving arm 49 and actuating switch 50. Actuation of switch 50 causes air cylinder 51 to move knife 52 horizontally across orifice 12 from which the tubing is being extruded so as to cut the tubing into short lengths.

As shown in the drawings, the pivot point of arm 18 may be varied between wide limits along its length. The plurality of holes 28 spaced along the arm can be aligned with similarly spaced holes 29 in block 26 without moving the arm longitudinally. The connecting pin 27 can be withdrawn from one set of holes and inserted into another thereby changing the distance between the pivot point and the point where the connecting rod 53 is attached to the arm. Since the position of the follower wheel 38 upon which the cam 39 acts remains unchanged, a vast variation in the stroke or throw of the valve member 13 is possible. In addition, by raising and lowering the pivot support member, shown in the drawing as tapered shim 31, the position of the valve member 13 also can be changed.

These adjustments make it simple to compensate for variations in operating conditions, such as temperature or raw material changes, which otherwise would result in increased or decreased swelling or strain recovery of the extruded tubing. Also, the simplicity of these adjustments makes it much easier to convert from the production of one article to another where the outline or shape of the new article requires a different parison contour.

One main advantage of the apparatus and method of the invention is that since the cutter is operated by the rotation of the contouring cam, the reference point is never lost, even in continuous operation over a long period of time. The reference point is that point at which the pattern begins to be impressed on the issuing tube and is just above the point from which the previous length was severed. Thus, each length of tubing will have one complete contour pattern along its length, which pattern will be identical to that of each of the other lengths of tubing. Should a small variation in length occur, due to a variation in operating conditions, it would be automatically corrected in the next succeeding cycle and would accumulate as in methods heretofore employed.

The above description clearly shows that the method and apparatus of the present invention provide a simple and convenient means for controlling the wall thickness of extruded tubing more accurately than heretofore possible. Furthermore, the present invention provides for the control of such wall thickness while avoiding the problem of inaccuracy, due to drift in the electrical and mechanical components employed. Moreover, each successive length of plastic tubing produced according to the invention is substantially identical in contour, irrespective of the speed of extrusion or the length of tubing selected. Also, the invention provides a convenient means for minimizing waste ordinarily encountered because of the inability to accurately control the contour of the extruded tubing.

From the above description of the invention, it will be apparent that various modifications in the apparatus and procedures described in detail and shown in the drawing may be made within the scope of the invention. For example, the shapes and arrangement of the various cams may be modified for the control of particular contours of extruded tubing. Also, the air cylinders may be replaced by other devices which function in a similar manner. Therefore, the invention is not intended to be limited to the specific details of the apparatus and method described herein except as may be required by the following claims.

What we claim is:

1. Apparatus for controlling the wall thickness of plastic tubing comprising an extrusion die having a chamber therein terminating on one end in an outlet orifice, a valve member positioned within said chamber forming an annular outlet orifice with said extrusion die, at least one of which chamber and valve member is inwardly tapered, a supporting frame, an arm pivotally attached to said frame, actuating means to cyclically move said arm through an arc path in a pattern of movement toward and away from said outlet orifice, adjusting means to change the pivot point of said arm so as to change the size of the arc angle, and means connecting said arm and said valve member to translate the cyclical movement upon said arm into movement of said valve member to regulate the flow of plastic material through said orifice.

2. Apparatus for controlling the wall thickness of plastic tubing comprising an extrusion die having a chamber therein terminating on one end in an outlet orifice, a valve member positioned within said chamber forming an annular outlet orifice with said extrusion die, at least one of which chamber and valve member is inwardly tapered, a supporting frame, an arm pivotally attached to said frame, actuating means to cyclically move said arm through an arc path in a pattern of movement toward and away from said outlet orifice, adjusting means to move the pivot of said arm relatively more or less remote from said extrusion die, means connecting said arm and said valve member to translate the cyclical movement upon said arm into movement of said valve member to regulate the flow of plastic material through said orifice, and cutting means arranged to sever plastic material flowing through said orifice successively at the end of a fixed time period determined by said actuating means.

3. Apparatus for controlling the wall thickness of plastic tubing, comprising: extrusion means having a variable annular outlet orifice formed by first and second members, movement of said first member in one direction relative to said second member causing said annular outlet orifice to be enlarged in size and movement of said first member in a second direction relative to said second member causing said annular outlet orifice to be contracted in size; a supporting frame; an arm pivotably mounted on said frame; means connecting said arm and said first member of said extrusion means so that movement of said arm causes movement of said first member to vary the size of said outlet orifice depending upon the direction of movement of said first member; pivot adjusting means for varying the pivot point of said arm, said pivot point selected by means of said pivot adjusting means establishing a basic wall thickness of tubing extruded through said outlet orifice; and actuating means for causing said arm to be pivoted about said pivot point in a predetermined pattern to thereby vary the thickness of at least portions of said extruded tubing relative to said basic thickness established by said pivot adjusting means.

4. Apparatus for controlling the wall thickness of plastic tubing, comprising: extrusion means having a variable annular outlet orifice formed by a chamber with an opening at one end and a valve within said chamber adjacent to said one end, said valve being movable with respect to said chamber with movement of said valve toward said chamber opening causing said annular orifice to be contracted in size and movement of said valve away from said chamber opening causing said annular orifice to be enlarged in size; a frame supporting said extrusion means; an arm pivotably mounted on said frame; means connecting said arm and said valve whereby movement of said arm causes movement of said valve to thereby vary the size of said outlet orifice depending upon the direction of valve movement relative to said chamber opening; pivot adjusting means for varying the pivot point of said arm, said pivot point selected by means of said pivot adjusting means establishing a basic wall thickness of tubing extruded through said outlet orifice; and actuating means for causing said arm to be pivoted about said pivot point in a predetermined pattern to thereby vary the thickness of at least portions of said extruded tubing relative to said basic thickness established by said pivot adjusting means.

5. Apparatus for controlling the wall thickness of plastic tubing, comprising: an extrusion die having a chamber therein terminating at one end in an outlet orifice; a valve member positioned within said chamber forming an annular outlet orifice with said extrusion die, at least one of which chamber and valve member being inwardly tapered; a supporting frame; an arm pivotably mounted on said frame; actuating means to cyclically move said arm in a predetermined pattern about the pivot point of said arm so that the portions of said arm removed from said pivot point move in an arc path; adjusting means to change the pivot point of said arm; and means connecting said arm and said valve member to translate the cyclical movement of said arm about the selected pivot point into movement of said valve member to thereby determine the flow of plastic material through said orifice.

6. Apparatus for forming a plurality of plastic tubes of controlled wall thickness, comprising: extrusion means having a variable annular outlet orifice formed by first and second members, movement of said first member in one direction relative to said second member causing said annular outlet orifice to be enlarged in size and movement of said first member in a second direction relative to said second member causing said annular outlet orifice to be contracted in size; a supporting frame; an arm pivotably mounted on said frame; means connecting said arm and said first member of said extrusion means so that movement of said arm causes movement of said first member to vary the size of said outlet orifice depending upon the direction of movement of said first member; pivot adjusting means for varying the pivot point of said arm, said pivot point selected by means of said pivot adjusting means establishing a basic wall thickness of tubing extruded through said outlet orifice; actuating means for causing said arm to be pivoted about said pivot point in a predetermined pattern to thereby vary the thickness of at least portions of said extruded tubing relative to said basic thickness established by said pivot adjusting means; cutting means adjacent to said annular outlet orifice; and control means operatively connected with said actuating means and said cutting means for automatically controlling both the wall thickness and the length of plastic tubes produced by said apparatus.

7. Apparatus for forming a plurality of plastic tubes of controlled wall thickness, comprising: extrusion means having a variable annular outlet orifice formed by first and second members, movement of said first member relative to said second member causing said annular outlet orifice to be enlarged in size and movement of said first member in the opposite direction relative to said first direction and said second member causing said annular outlet orifice to be contracted in size; first actuating means for causing movement of said first member, said actuating means including first cam means; cutting means adjacent to said annular outlet orifice; second actuating means for causing cutting movement by said cutting means; second cam means; means including a switch operated by said second cam means for controlling said second actuating means; a shaft having said first and second cam means attached thereto; and means including a motor operatively connected to drive said shaft for causing movement of said first and second cam means in timed relationship with respect to one another.

References Cited by the Examiner

UNITED STATES PATENTS

| | | | |
|---|---|---|---|
| 2,379,816 | 7/1945 | Mabbs | 18—2 |
| 2,379,817 | 7/1945 | Mabbs | 18—2 |
| 2,632,202 | 3/1953 | Haines | 18—14 XR |
| 3,019,481 | 2/1962 | Negro | 18—5 |
| 3,031,718 | 5/1962 | Adams | 18—5 |
| 3,032,809 | 5/1962 | Willard | 18—5 XR |
| 3,069,722 | 12/1962 | Kato | 18—5 |
| 3,080,614 | 3/1963 | Adams. | |
| 3,081,489 | 3/1963 | Jackson et al. | 18—5 |
| 3,082,484 | 3/1963 | Sherman. | |
| 3,114,932 | 12/1963 | Donnelly | 18—5 XR |

J. SPENCER OVERHOLSER, *Primary Examiner.*

MORRIS LIEBMAN, MICHAEL V. BRINDISI,
*Examiners.*

M. H. ROSEN, W. L. McBAY, *Assistant Examiners.*